United States Patent
Kinnersly

(10) Patent No.: US 6,205,782 B1
(45) Date of Patent: Mar. 27, 2001

(54) STIRLING CYCLE MACHINE

(75) Inventor: Richard Furneaux Kinnersly, Romsey (GB)

(73) Assignee: Sustainable Engine Systems Ltd., London (GB)

( * ) Notice: Subject to any disclaimer, the term of this patent is extended or adjusted under 35 U.S.C. 154(b) by 0 days.

(21) Appl. No.: 09/424,288

(22) PCT Filed: May 18, 1998

(86) PCT No.: PCT/GB98/01422

§ 371 Date: Jan. 3, 2000

§ 102(e) Date: Jan. 3, 2000

(87) PCT Pub. No.: WO98/53194

PCT Pub. Date: Nov. 26, 1998

(30) Foreign Application Priority Data

May 23, 1997 (GB) .................................... 9710608

(51) Int. Cl.⁷ ...................................... F01B 29/10
(52) U.S. Cl. ............................... 60/517; 60/519
(58) Field of Search .................... 60/517, 519; 92/165 R

(56) References Cited

U.S. PATENT DOCUMENTS

| 1,524,894 | 2/1925 | Thomson . | |
|---|---|---|---|
| 3,760,592 | * 9/1973 | Neelen | 60/517 |
| 4,285,665 | * 8/1981 | Enga | 60/517 X |
| 5,433,078 | 7/1995 | Shin . | |
| 5,857,436 | * 1/1999 | Chen | 60/517 X |

FOREIGN PATENT DOCUMENTS

| 0252026 | 1/1988 | (EP) . |
|---|---|---|
| 1044103 | 11/1953 | (FR) . |
| 1306911 | 2/1963 | (FR) . |
| 91/16534 | 10/1991 | (WO) . |

* cited by examiner

Primary Examiner—Hoang Nguyen
(74) Attorney, Agent, or Firm—Davis and Bujold

(57) ABSTRACT

A Stirling cycle machine has a piston (11) which reciprocates in a cylinder (12) and defines a hot chamber (23) between the piston (11) and end of cylinder (12). Heat exchange for the working fluid in the hot chamber (23) is effected while the working fluid is outside the hot chamber (23) in a flow path (24) communicating with that chamber (23). The piston (11) has a concave crown forming a surface (31) of the hot chamber (23). A seal is provided by a land (33) of larger diameter than the general diameter of the piston (11) formed around the upper periphery of the piston (11) and at least one annular groove (36) formed in the land (33) to disrupt free flow of working fluid along the gap between the land (33) and the cylinder wall.

8 Claims, 4 Drawing Sheets

STIRLING CYCLE MACHINE

The invention relates to Stirling cycle machines and in particular to a piston employed in such a machine. In referring to a Stirling cycle machine we include those machines which operate on a cycle resembling the Stirling cycle but with some overlap and merging of the individual phases of the classical Stirling cycle. The invention will be described primarily by reference to Stirling cycle heat engines which generate mechanical power from applied heat but also applies to Stirling cycle heat pumps. Typically the invention is applied to the kind of piston often referred to as a displacer. As an alternative or in addition, in a Stirling cycle engine of the kind having a separate power piston connected to the hot end of the displacement volume, the invention may also be applied to the power piston. The invention will be described primarily in connection with its application to a displacer piston.

The Stirling cycle engine has well known attractions as compared with an internal combustion engine but has not been adopted generally because of certain practical difficulties. One such difficulty is provision of an effective long-life seal for a piston in its cylinder at the hot end of the engine in an environment where conventional lubricants cannot be used. One established practice is to employ a piston with a deep domed crown and to provide seals well below the crown and thus well away from the main hot area. However, the radiused and divergent upper part of the annular gap around the piston encourages hot charge gas to enter the annulus between the cylinder wall and the piston. Pumping losses occur in this annulus. In addition, the transfer of hot gas into the annulus tends to transfer heat down towards the seal, reducing the life and efficiency of the seal. Also, shuttle losses occur on reciprocation of the piston by heat transfer of a generally conductive nature from the hot cylinder wall to the piston when near top dead centre and corresponding heat transfer from the heated piston to a cooler part of the cylinder wall when the piston is the heated piston to a cooler part of the cylinder wall when the piston is near bottom dead centre.

An object of the invention is to provide an improved arrangement of piston.

According to one aspect of the invention a Stirling cycle machine in which a piston reciprocates in a cylinder to define a hot chamber of the machine and in which heat exchange for working fluid in the hot chamber is effected while the working fluid is outside the hot machine chamber in a flow path communicating with that chamber, the piston having a concave crown forming a surface of the hot chamber characterised in that the concave crown surface of the piston joins a cylindrical external surface of the piston to define an acute outer peripheral edge to the piston.

In order to establish a small volume in the hot chamber at top dead centre of the piston, the end wall of a cylinder forming the hot chamber has a generally corresponding convex internal surface.

According to a second aspect of the invention a Stirling machine of the kind to which the invention specifically relates is characterised in that the piston incorporates a land of larger diameter than the general diameter of the piston around its upper periphery.

An embodiment of the invention is described with reference to the accompanying drawings in which.

Figure 1:
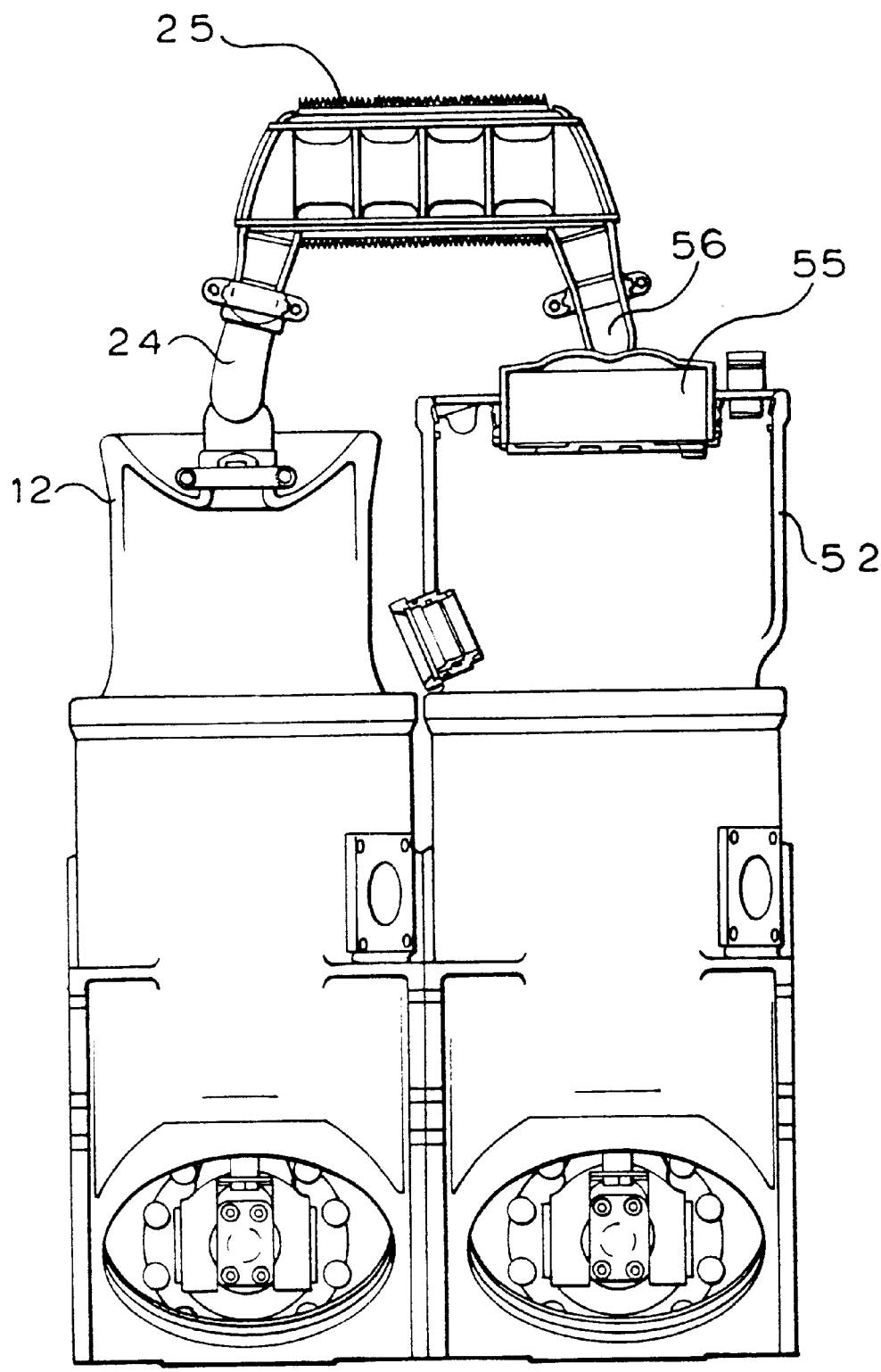
FIG. 1 is a side elevation of a two-cylinder Stirling cycle engine illustrating its general layout but showing little detail.

The displacer cylinder of FIG. 2 will be described initially with some cross-reference to FIG. 1. A displacer piston 11 is arranged to reciprocate in a displacer cylinder 12. The arrangement shown corresponds in many respects to that described in WO 91/16534. In particular, the very deep piston 11 is guided on a stanchion tube 13 by upper and lower bearings 14 and 15. The internal surface of cylinder 12 is not itself used directly for piston guidance. A seal arrangement 16 around the lower edge of the piston is positioned well away from the upper hot end of the piston. Vertical movement of the piston is connected to a crank shaft 20 through a flexible push rod 17, a rocker arm 18, forming part of a cranked lever 19 and a connecting rod 21. This arrangement corresponds in many respects to that described in WO 91/16533, enabling a seal between a conventionally lubricated crank and related parts of the engine and the necessary oil free piston arrangement to be provided by a part-spherical face seal 22.

Further mechanical details are not described because they can be established from the earlier published patent documents referred to above.

The space within cylinder 12 above piston 11 forms a hot working chamber 23 for the engine. Ducts 24 lead from the hot working chamber 23 to heaters 25 which enable heat from combusted fuel or other heat source to transfer heat to the working gas. The space 26 below piston 11 forms a cold working chamber for the engine. The source of cold gas will be described subsequently in relation to FIG. 3.

Figure 3:
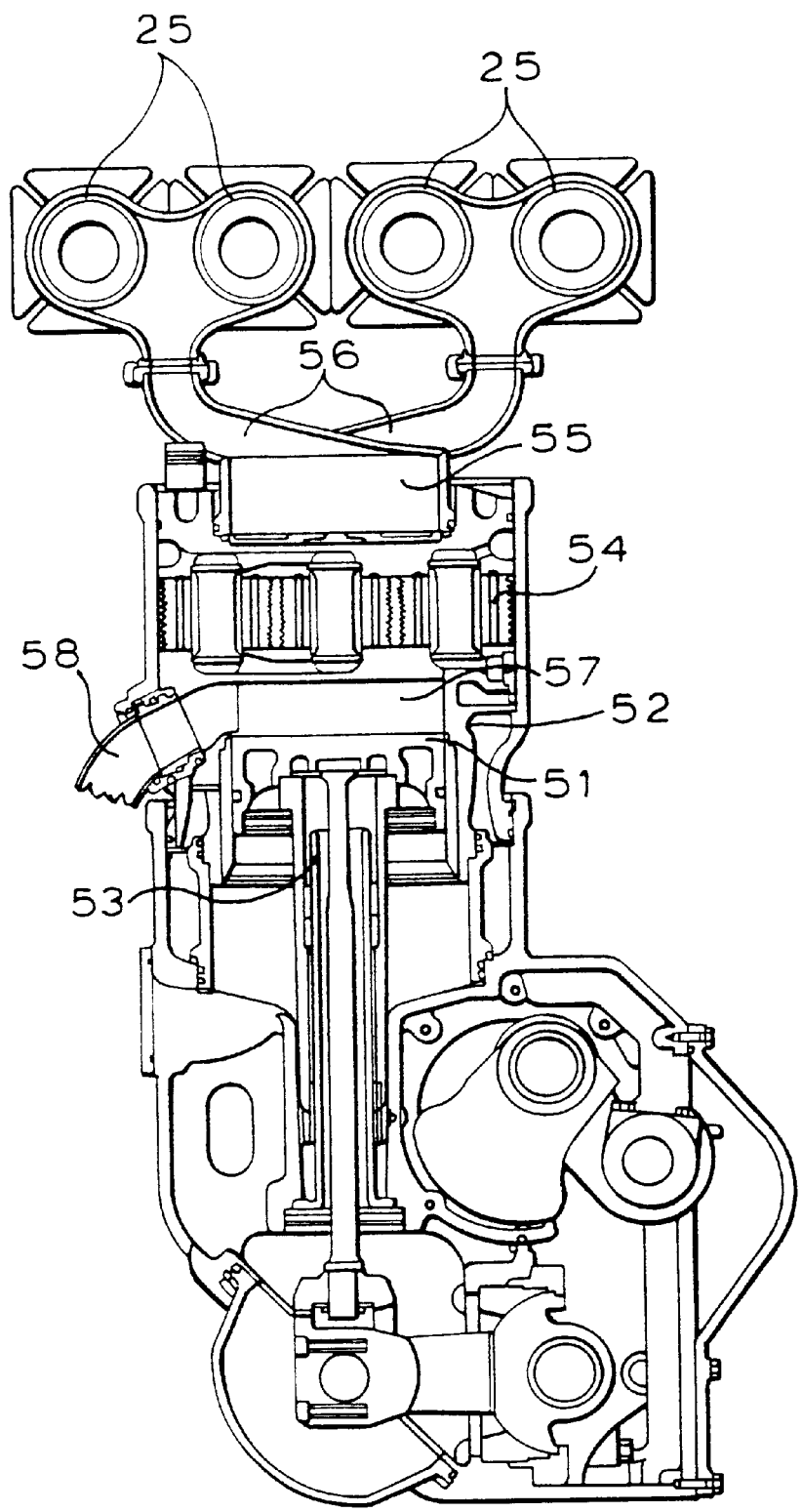
FIG. 3 is a cross-sectional view on line III—III of FIG. 1, showing a cross-section through the other cylinder incorporating a power piston, FIGS. 2 and 3 being illustrated broadly as mirror images of each other.

As shown in FIG. 3, a power piston 51 is reciprocable in a power cylinder 52 and is guided on a stanchion tube 53. Vertical movement of power piston 51 is connected to the same crank shaft 20 in a manner broadly similar to that for connection of displacer piston 11 to the crank shaft. Although for convenience, the two crank shaft connections are shown in a manner suggesting that they are mutually in phase, they are in practice set at a suitable phase angle to each other as conventionally required for operation of the stirling engine.

A cooler 54 is positioned immediately above the power piston 51 and a regenerator 55 is positioned above the cooler 54.

Figure 2:
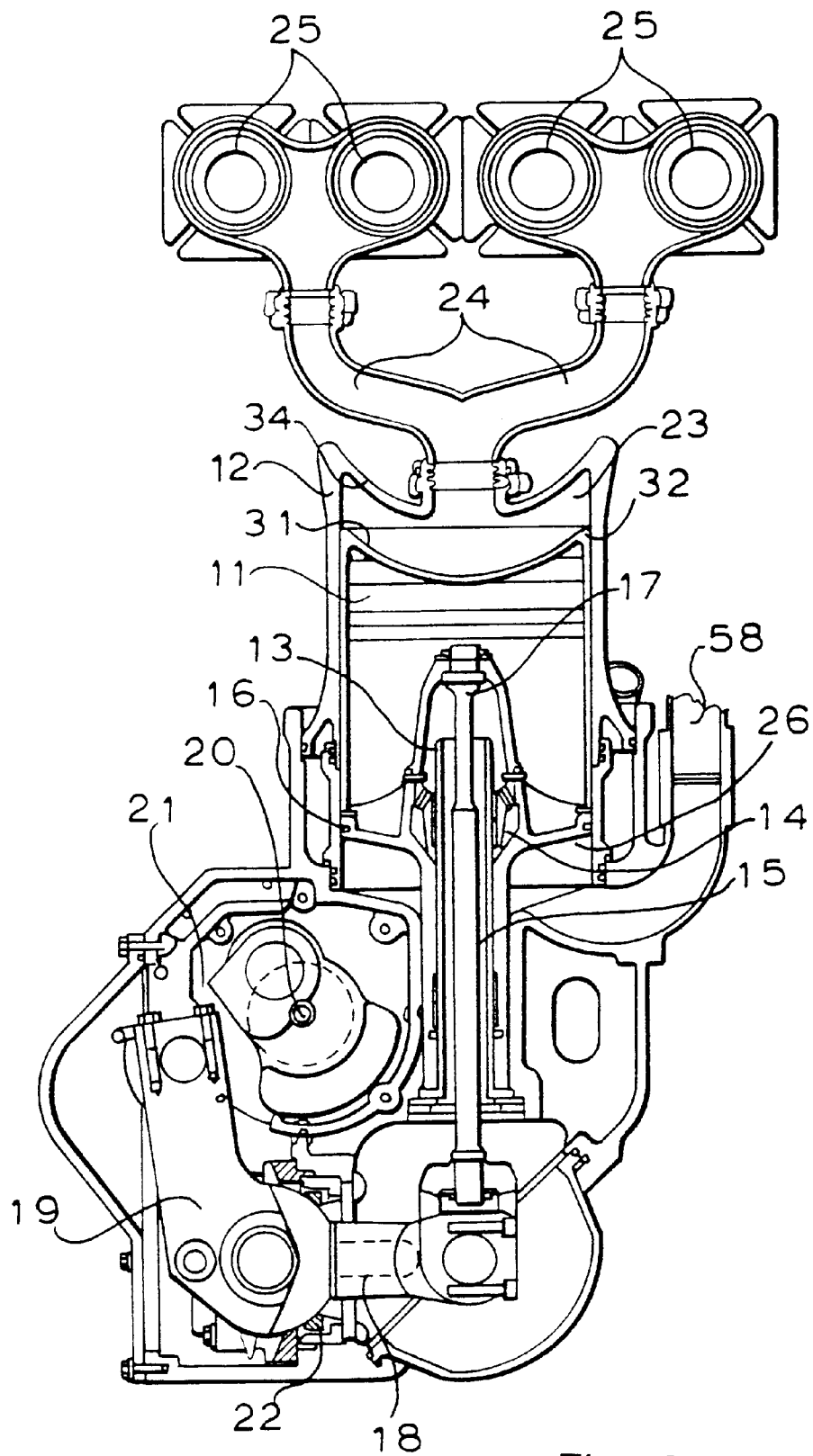
FIG. 2 is a section on line II—II of FIG. 1 showing details of one of the cylinders, namely the displacer cylinder.

As shown by a comparison of FIGS. 1, 2 and 3, there is a connection for working gas from hot working chamber 23, through ducts 24 and heater 25 to further ducts 56 which in turn lead through the regenerator 55 and cooler 54 to the working volume of the power cylinder 52 above piston 51. A further duct 58 communicates between working volume 57 to the cold space 26 shown in FIG. 2. To indicate continuity of the duct, reference numeral 58 is shown in both FIG. 2 and FIG. 3.

Operation is conventional for this kind of Stirling engine layout. The displacer piston displaces working fluid alternately between the hot working chamber 23 and the cold working chamber 26, through the heater, regenerator and cooler. When the working gas is predominantly in the hot working chamber 23, the majority of the gas is at elevated temperature resulting in relatively high pressure whereas when the piston is at top dead centre and the working gas is predominantly in the cold chamber, it is at a lower pressure. By expanding the high pressure working gas by a downward stroke of the power piston, work is derived from the engine. The power piston is then raised with the working fluid generally cool and at lower pressure requiring some less work to be applied during compression than is derived during expansion. The hot high pressure expansion and cool low pressure compression thus provide a net work output.

As thus far described, the engine is conventional or based on features described in WO91/16533 and WO91/16534.

Figure 4:
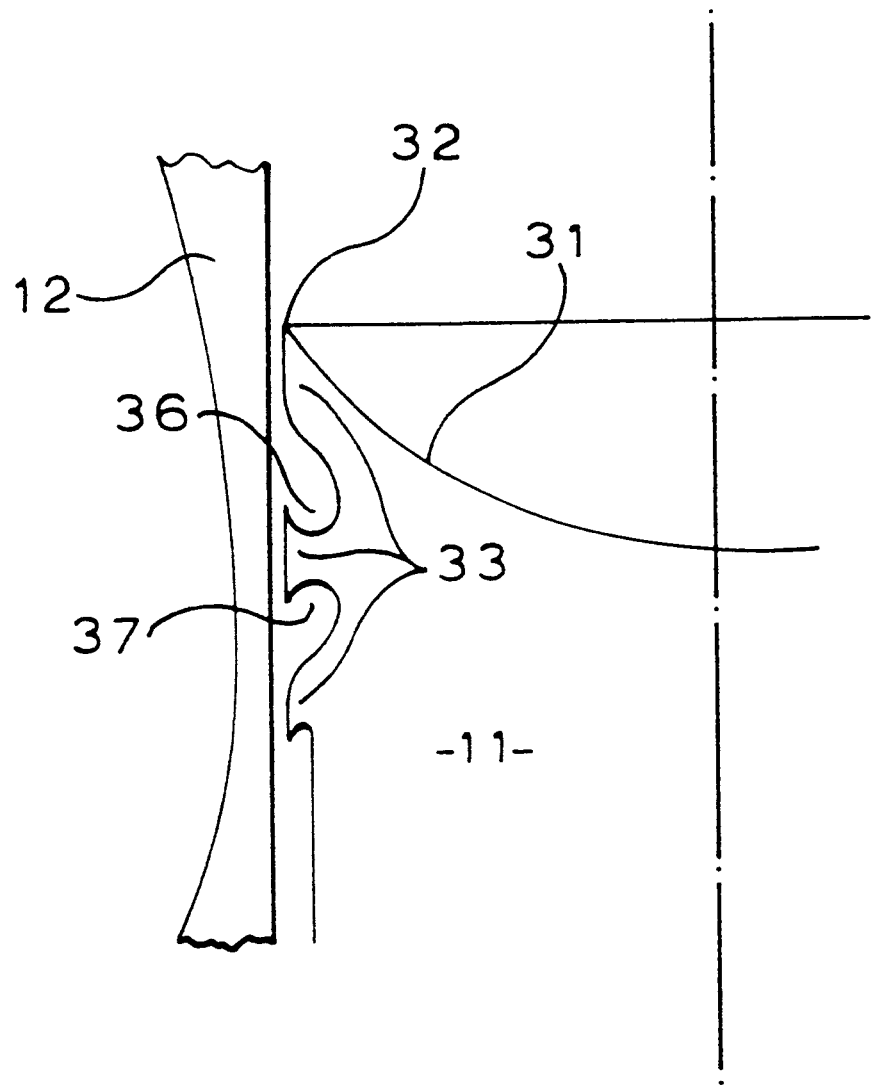
FIG. 4 illustrates a detail of a piston.

The invention is concerned particularly with the details of the displacer piston 11, details of which are shown in FIGS. 2 and 4. The upper surface 31 of the piston crown is concave and joins the cylindrical external surface of the piston at a sharp edge. In accordance with the arrangement described in WO91/16533, piston 11 does not contact or bear against the cylinder wall 12 but is guided internally. The small clearance provided between piston 11 and cylinder 12 is sealed near the base of the piston by seals 16.

In order to keep space within the hot chamber to a minimum at top dead centre, the internal end surface 34 of the cylinder end is convex and corresponds generally to the shape of the concave top surface of the piston. The connection for hot gas into the cylinder is in this end surface and in the example shown is central.

The arrangement of the hot working chamber 23, based primarily on the concave upper piston surface, has several advantages. As the piston rises towards top dead centre, the sharp outer edge has a tendency to sweep hot gas away from the cylinder wall and in particular to discourage flow of gas down through the gap between piston and cylinder wall. Also, as the piston is lowered and hot gas flows into the cylinder, the gas tends to impinge on the concave upper piston surface and to swirl round so that it is moving upward at the periphery of the piston. This again tends to prevent flow of such gas down the gap between piston and cylinder. A suitably sharp edge 32 to the piston crown for example an angle of about 30° as shown in FIG. 4 can reduce the Coefficient of Discharge through the gap from a typical figure of 0.7 to perhaps 0.3. The long piston skirt allows the seal 16 to be well away from the main volume of hot gas which in turn helps it to operate at a low temperature and thus to have a long life.

An additional benefit of a concave piston crown over a convex crown arises because the predominant positive pressure in the hot chamber loads the wall of the piston crown in tension as opposed to compressive loads which occur with a convex piston. The tensile loading leads to improved structural stability allowing an important weight reduction in a key reciprocating component.

It is particularly advantageous to use an arrangement in which the piston is guided internally on stanchion tube 13 because, as explained in WO91/16533 it permits very close control of the movement of the piston in the cylinder allowing a particularly small gap between piston and cylinder to be chosen.

The piston incorporates a land 33 of larger diameter than the general diameter of the piston around its upper periphery. The land has a minimum clearance in the cylinder commensurate with the avoidance of contact between piston and cylinder at all temperatures encountered in use of the engine. Before the land 33, there is a wider gap between the piston skirt and the piston wall. Conductive shuttle loss in efficiency of the engine increases with heat transfer between the piston and cylinder wall so the larger gaps tends to reduce shuttle loss. However a large gap tends to increase pumping losses and heat loss from hot gas in the gap. The small clearance associated with the land tends to prevent gas flow into the gap and thus reduces these pumping and heat losses.

In order to further discourage hot gas flow down through the gap between piston and cylinder towards the seal, the land 33 of the piston may be provided with annular grooves 36 and 37 around its periphery as more clearly shown in FIG. 4. Any working gas which does tend to flow down the gap between piston and cylinder firstly encounters the upper groove 36. Groove 36 is inclined generally against the direction of flow which it is intended to prevent. The obtuse upper angle of groove 36 is smoothly radiused into the main section of the groove, the root of which is radiused, and the outer edge of which extends smoothly upwards from the radius at the root to the sharp junction with the cylindrical wall of the piston. Gas that does leak down the annular gap to the groove tends to adhere to the radiused upper edge of the inclined groove, thus initiating a vortex which is clockwise in the configuration shown for groove 36 in FIG. 4. Thus the direction of the rotation of flow in the groove root is opposite to that which would allow flow over the sharp edge of the groove and progressively down toward the main annular gap between piston and cylinder. The effect of a groove, and in particular a groove of the shape shown for groove 36 is to further restrict flow of working gas down the gap.

Of course, in a static state of the engine, the gap between the piston and the cylinder wall contains working gas at operating pressure. The general pressure in the system varies cyclically during operation. As pressure increases, there is a tendency for further flow into the gap between piston and cylinder and as pressure decreases there is a tendency for flow out of this gap. One objective is so far as possible to avoid changing the gas already in the gap for hot gas from which heat would be dispersed inefficiently and which would cause the undesired rise in temperature of the seal. The various factors described above are intended to reduce the flow of gas in to the gap and perhaps they also tend to prevent mixing of gas in the gap, thereby tending to preserve the lower temperature gas nearer the seal. Another objective of reducing or retarding gas flow into the gap is that a greater proportion of the hot gas remains in the hot chamber while expansive work is extracted from it, thereby tending to improve efficiency of the engine.

Of course some gas flows into the gap as pressure increases and some flows out as pressure decreases. The lower groove 37 corresponds to the upper groove 36 except that its shape is reversed so that it is particulary efficient in preventing flow upward out of the gap. This in turn contributes to restricting the change of gas within the gap during a working cycle. More than two grooves may be provided in the land 33 if greater resistance to flow into and out of the gaps is required.

The invention has so far been described with particular reference to the hot end of a displacer piston in a Stirling engine with a separate power piston. Normal practice, employed in the engine shown, connects the power piston to the cold side of the engine so that the power piston operates at a relatively low temperature and does not have the normal problems of a hot cylinder in a Stirling engine. However, to the extent that the arrangement shown for the hot displacer piston overcomes the normal problems of a hot cylinder, it might become practical to connect the power piston to the hot side of the engine and to employ a concave piston together with some or all of the features shown for the displacer piston, thereby enabling the power piston to operate successfully and conveniently in a high temperature environment. Thus the invention is not restricted to use on a displacer piston in a Stirling engine. In contrast, it may be valuable to employ it in any closed cycle reciprocatory engine where high temperature working is experienced and seals are required to operate without conventional lubricants.

Similarly, the Stirling cycle engine described above may be used or adopted for use as a heat pump with mechanical power applied to the crank shaft and heat pumped from the heat exchanger identified as 'cooler' 54 to that identified as 'heater' 25.

What is claimed is:

1. A stirling cycle machine in which a piston (11) reciprocates in a cylinder (12) to define a hot chamber (23) of the machine, and in which heat exchange for working fluid in the hot chamber (23) is effected while the working fluid is outside the hot chamber (23) in flow path (24) communicating with that chamber (23); the piston (11) having a concave crown forming a surface (31) of the hot chamber (23); characterize in that the concave crown surface (31) of the piston (11) joins a cylindrical external surface to the piston to define an acute outer peripheral edge (32) to the piston.

2. The stirling cycle machine as claimed in claim 1 wherein the end wall of the hot chamber (23) has a convex internal surface (34) and inlet for the working fluid into the hot chamber (23) is in the convex end wall (34) of the chamber (23).

3. The stirling cycle machine as claimed in claim 1 wherein the upper end of the piston (11) has a clearance with respect to the cylinder wall and a piston seal (33, 36, 37) with respect to the cylinder (12) is remote from the concave crown (31).

4. The stirling cycle machine as claimed in claim 1 wherein the outer surface of the piston (11) near the concave crown (31) has at least one annular groove (36) adapted to disrupt free flow of working fluid along the gap between the piston (11) and the cylinder wall.

5. The stirling cycle machine as claimed in claim 4 wherein the groove (36) has an undercut profile such that the groove (36) has a sharp lip facing towards the direction from which it restricts flow.

6. A stirling cycle machine in which a piston (11) reciprocates in a cylinder (12) to define a hot chamber (23) of the machine, and in which heat exchanger for working fluid in the hot chamber (23) is effected while the working is outside the hot chamber (23) in the flow path (24) communicating with that chamber (23); characterised in that the piston (11) incorporates a land (33) of larger diameter than the general diameter of the piston (11) around its upper periphery.

7. The stirling cycle machine as claimed in claim 6 wherein the outer surface of the land (33) has at least one annular groove (36) adapted to disrupt free flow of working fluid alone the gap between the land (33) and the cylinder wall.

8. The stirling cycle machine as claimed in claim 7 wherein the groove (36) has an undercut profile such that the groove (36) has a sharp lip facing towards the direction from which it restricts flow.

* * * * *